(12) United States Patent
Holtz et al.

(10) Patent No.: US 8,353,008 B2
(45) Date of Patent: Jan. 8, 2013

(54) AUTHENTICATION DETECTION

(75) Inventors: Brian Holtz, Los Altos Hills, CA (US);
Kevin Brown, Milpitas, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1269 days.

(21) Appl. No.: 12/123,351

(22) Filed: May 19, 2008

(65) Prior Publication Data

US 2009/0288142 A1    Nov. 19, 2009

(51) Int. Cl.
*H04L 29/06* (2006.01)
(52) U.S. Cl. ............ 726/3; 709/225; 705/319; 715/221; 715/222; 715/223; 715/224; 715/225
(58) Field of Classification Search ....... 726/3; 705/319
See application file for complete search history.

(56) References Cited

U.S. PATENT DOCUMENTS

| | | | |
|---|---|---|---|
| 7,263,076 B1 * | 8/2007 | Leibovitz et al. | 370/310 |
| 2001/0004759 A1 * | 6/2001 | Heikki | 713/202 |
| 2004/0210434 A1 * | 10/2004 | Wang et al. | 704/9 |
| 2005/0097170 A1 | 5/2005 | Zhu et al. | |
| 2005/0171954 A1 | 8/2005 | Hull et al. | |
| 2007/0043626 A1 | 2/2007 | Duvall et al. | |
| 2007/0061195 A1 | 3/2007 | Liu et al. | |
| 2008/0082433 A1 * | 4/2008 | Hodges et al. | 705/34 |

OTHER PUBLICATIONS

Reichling et al., "Matching Human Actors based on their Texts: Design and Evaluation of an Instance of the ExpertFinding Framework", Nov. 2005, pp. 61-70.*
Vu et al., "Improving password security and memorability to protect personal and organizational information", Apr. 2007, International Journal of Human-Computer Studies, pp. 744-757.*
Mark Day et al., RFC 2778, "A Model for Presence and Instant Messaging" (Feb. 2000) 14 pages.
Mark Day et al., RFC 2779, "Instant Messaging/Presence Protocol Requirements" (Feb. 2000) 22 pages.

* cited by examiner

*Primary Examiner* — David Pearson
*Assistant Examiner* — Thaddeus Plecha
(74) *Attorney, Agent, or Firm* — Frommer Lawrence & Haug LLP; John W. Branch

(57) ABSTRACT

A device, system, and method are directed towards facilitating a registration of a user for a network service. In one embodiment, a server receives, from a user at a client device, user information including at least one text block. The server analyzes the text block to determine an authenticity value of the user information. The analysis may be based on the length of a lexicon of the text block, the size of a word such as the longest word in the text block, or the number of clauses in the text block. The analysis may be further based on expected values determined by such values in authentic text blocks of a similar nature. Based on the authenticity value, the system may allow the user to access the network service, disallow access to the network, allow conditional access, queue the registration application for further review, or take other actions.

18 Claims, 9 Drawing Sheets

Create a Profile

Step 1: About Me

Check some boxes, write your blurb, and start meeting people who get what you're all about. If you run out of time, you can always save it and finish up later.

✻ required fields

✻ My first name: [_____] ← 402
✻ I am a: [Man ▼] seeking a [Woman ▼] ← 406
404
✻ My ZIP/Postal Code: [_____] ← 408

Appearance

My ethnicity is mostly [Select One ▼] ← 410

My height is [Select One ▼] ← 412

414

Personality

In my free time I'm interested in:
☐ Arts      ☐ Theater
☐ Community Service   ☐ Travel
☐ Dancing   ☐ Cooking

Write a short intro line for your profile

Grab people's attention and introduce yourself. ← 420

✻ Your Intro Line: [_____]

424

Describe yourself and your ideal match

Take a couple of minutes and write about:

• Your Life: Hobbies, aspirations, attachments, work/life balance, triumphs
• Your Personality: Quirks/traits friends admire, cute faults, likes/dislikes
• Your Match: Personality, physical parameters, must haves/must not haves The important part is to get something down for now, you can always polish it up later. Not sure what to write? Ask the Profile Assistant

422

Enter at least 3-4 sentences (120 characters or more), with no HTML tags

AUTHENTICATION DETECTION

FIELD OF THE INVENTION

The present invention relates generally to computing software and, more particularly, but not exclusively to a method and system for analyzing information in an online social network.

BACKGROUND OF THE INVENTION

Social networking is a concept that an individual's personal network of friends, family colleagues, coworkers, community of interest, and the subsequent connections within those networks, can be used to find connections for dating, job networking, service referrals, activity partners, and the like.

Social networking may include mechanisms for an individual to submit descriptive information, such as biographical information, interests, social, political, or other opinions, and the like. Descriptive information may be used in a number of ways, such as searching, viewing by others when seeking connections, or learning about an individual.

The quality of submitted information is therefore a factor in the utility and performance of a social networking web site or service. In some situations, a human operator may review submitted information to determine its quality, possibly rejecting information that fails to meet certain standards. The use of human operators to perform such functions is limiting with respect to time, costs, scaling to large numbers, as well as other limitations. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 4 is a pictorial representation of a web page that may be employed to retrieve registration information, in accordance with an embodiment of the invention.

DETAILED DESCRIPTION OF THE INVENTION

Figure 1:
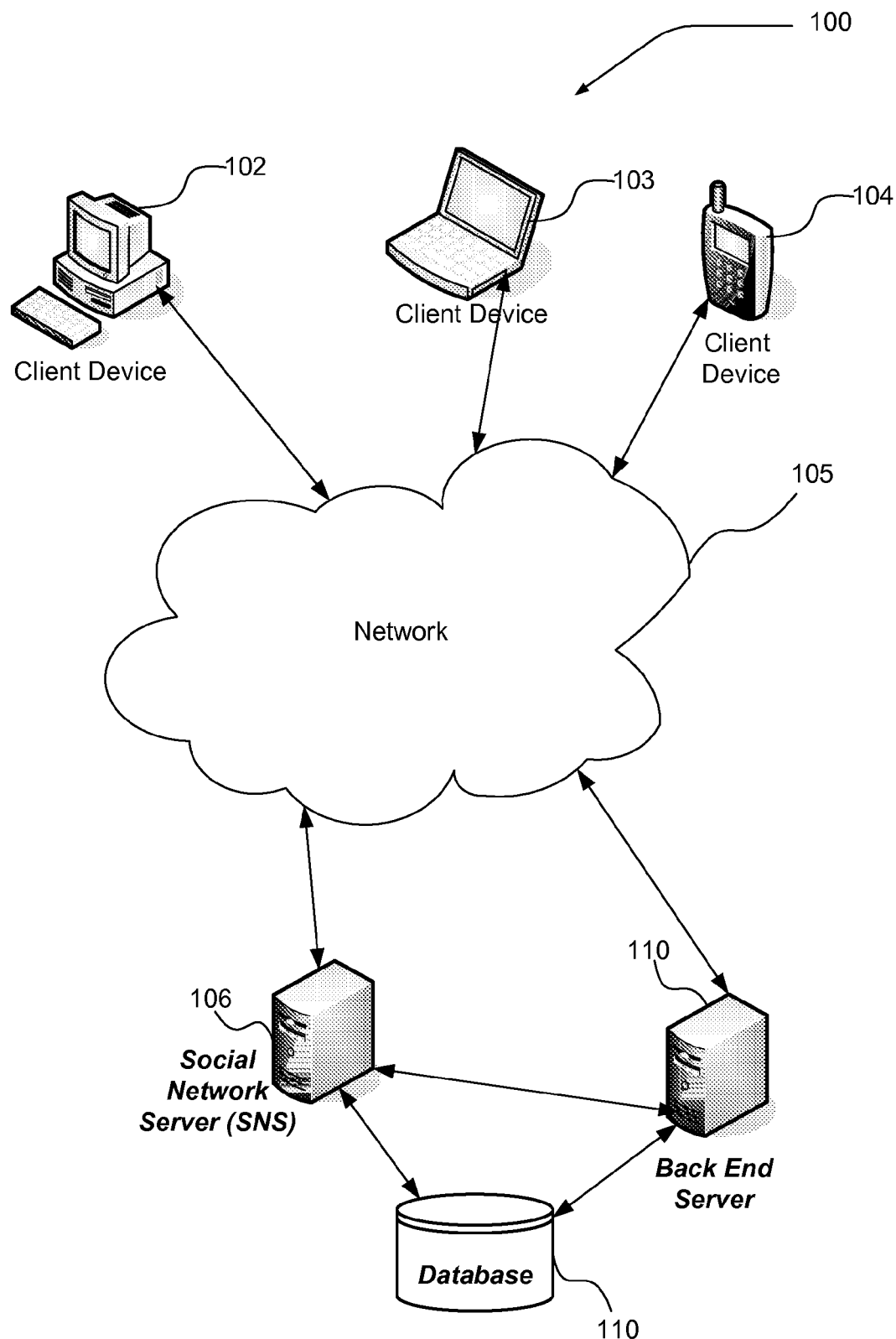
FIG. 1 is a system diagram of one embodiment of an environment in which the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "receiving" an item, such as a request, response, or other message, from a device or component includes receiving the message indirectly, such as when forwarded by one or more other devices or components. Similarly, "sending" an item to a device or component includes sending the item indirectly, such as when forwarded by one or more other devices or components.

As used herein, the term "client application" refers to an application that runs on a client computing device. A client application may be written in one or more of a variety of languages, such as 'C', 'C++', 'J2ME', 'Brew", Java, and the like. Browsers, email clients, text messaging clients, calendars, and games are examples of client applications. A mobile client application refers to a client application that runs on a mobile device.

Briefly stated, the present invention is directed towards facilitating the registration of a user and access by the user to a network service. Mechanisms of the invention may enable a server to analyze user information and selectively allow access to a network service based on the user information and the analysis. A server may receive information submitted by a user at a client device, wherein the user information may include one or more text blocks. The mechanisms of the invention may include performing one or more types of analyses of the user information, and, in particular, the text blocks. Based on the analyses, mechanisms of the invention may determine an authenticity value representing a likelihood that the user information is authentic information, and selectively perform actions based on the determined likelihood of authenticity. The actions may include allowing access to the network service, disallowing access, conditionally allowing access, or submitting the registration application for further review.

The mechanisms of the invention may include determining an authenticity value based on a length of a lexicon derived from the one or more text blocks and, in particular, an authenticity value that increases in relation to increases of the lexicon length.

The mechanisms of the invention may include determining an authenticity value based on a length of at least one word in the one or more text blocks and, in particular, the length of the longest word, wherein words may be delimited by white space, punctuation, and the like. A threshold word length may be used in a comparison with the longest word such that exceeding the threshold indicates a reduced likelihood of authenticity.

The mechanisms of the invention may include determining an authenticity value based on a number of clauses in the one or more text blocks, wherein clauses are recognized by a set of punctuation delimiters, such as periods, commas, question marks, exclamation marks, and the like. A threshold clause count may be used in a comparison with the number of clauses such that a clause count under the threshold indicates a reduced likelihood of authenticity.

The mechanisms of the invention may include determining an authenticity value based on one or more metrics derived from authentic text blocks received from prior users.

Systems and methods of the invention may include use of a human-based filtering process that is selectively used based on a determined likelihood of authenticity. Registration applications that are conditionally approved may be given a higher priority for the human-based filtering process.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes client devices 102-104, network 105, social network server (SNS) 106, database 108, and back end server 110.

A variety of client devices may be employed in accordance with the invention. The client devices may include mobile devices, digital home clients such as personal computers and media centers, and other client devices. Generally, client devices 102-104 may include virtually any computing device capable of receiving and sending a message over a network, such as network 105, or the like. One type of client device is a mobile device. A mobile device may be described generally as a client device that is configured to be portable. Client devices 102-104 may have the capability of connecting to a network using wireless technology, wired technology, or a combination of both wired and wireless technologies. Thus, client devices 102-104 may include virtually any computing device capable of connecting to another computing device and receiving information. Such devices include devices such as personal computers, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 102-104 typically range widely in terms of capabilities and features. For example, a cell phone may have a numeric keypad and a few lines of monochrome LCD display on which only text may be displayed. In another example, another cell phone or web-enabled device may have a touch sensitive screen, a stylus, and several lines of color LCD display in which both text and graphics may be displayed.

A web-enabled client device may include a browser application that is configured to receive and to send web pages, web-based messages, and the like. The browser application may be configured to receive and display graphics, text, video, multimedia, and the like, employing virtually any web based language or protocol, such as HTTP, wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Client devices 102-104 may include one or more other client applications that are configured to receive content from another computing device. The client application may include a capability to provide and receive textual content, graphical content, audio content, video content, and the like. The client application may further provide information that identifies itself, including a type, capability, name, and the like.

Client devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as SNS 106, another web server, or the like. However, the present invention is not limited to these message protocols, and virtually any other message protocol may be employed.

Client devices 102-104 may be further configured to enable a user to participate in communications sessions, such as IM sessions. As such, client devices 102-104 may include a client application that is configured to manage various actions on behalf of the client device. For example, the client application may enable a user to interact with the browser application, email application, IM applications, SMS application, and the like. Yahoo! Messenger, provided by Yahoo!, is an example of an IM client and IM protocol. Request for Proposal (RFC) 2779, available at http://www.ietf.org/rfc/rfc2779.txt!number=2779, and RFC 2778, available at http://www.ietf.org/rfc/rfc2778.txt!number=2778, describe proposals for instant messaging protocol standards and an instant messaging service, though the present invention described herein is not limited to these proposals, and at least some of the features or components of the proposals are not required to implement the present invention. Generally, instant messaging provides an ability for at least two computing devices to exchange messages in real time.

Client devices 102-104 may further be configured to include a client application that enables the end-user to log into an end-user account that may be managed by a network application. Such an end-user account, for example, may be configured to enable the end-user to receive emails, send/receive IM messages, SMS messages, access selected web pages, maintain a digital wallet, or the like.

Client devices 102-104 may be further configured to enable a user to manage a user profile, category information, activity participation, and the like, which may in turn be saved at a location, such as SNS 106, database 108, and the like. As such, client devices 102-104 may further include a client application that is configured to manage various actions on behalf of the client device. For example, the client application may enable a user to interact with the browser application, email application, and the like, to manage a social network user's information. For example, the user may employ the client application, in part, to determine membership in a group, activity, and the like. The client application may interact with a process such as described below in conjunction with FIG. 3 to manage such social network user information.

Network 105 is configured to couple client devices 102-104, as well as other client devices not illustrated, and their components, with other network devices, such as SNS 106, back end server 110, and the like.

Network 105 may include any of a variety of wired or wireless sub-networks that may further overlay stand-alone ad-hoc networks, and the like, to provide an infrastructure-oriented connection for client devices 102-104. Such sub-networks may include mesh networks, Wireless LAN (WLAN) networks, cellular networks, and the like. Additionally, network 105 may connect to mobile devices with a wired connection, such as cable, phone lines, Ethernet wires, direct connections such as through a universal serial bus (USB) port, firewire port, other forms of computer-readable media, and the like, or any combination thereof. Network 105 may include wide area networks, such as the Internet. The invention may be used either generally with networks, specifically with wireless networks, or with various combinations of wireless and wired networks.

Network 105 may further include an autonomous system of terminals, gateways, routers, and the like connected by wireless radio links, and the like. These connectors may be configured to move freely and randomly and organize themselves arbitrarily, such that the topology of network 105 may change rapidly.

Network 105 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as client devices 102-104 with various degrees of mobility. For example, network 105 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, network 105 may include virtually any communication mechanism by which information may travel between client devices 102-104 and another computing device, network, and the like.

Network 105 may further include or employ one or more network gateways (not shown) that serve as intermediaries between client devices 102-105 and other network devices, such as SNS 106 or back end server 110. A network gateway may receive data from a device or network, transform the data, and forward the data to another device or network. A network gateway may perform a transformation in more than one direction. Transformation may, for example, include modifying protocols or communications mechanisms in order to facilitate communication between two devices or two networks, each of which may employ differing protocols. A WAP gateway is one type of network gateway. A WAP gateway may facilitate communication between a first device that uses the Wireless Application Protocol (WAP), and a second device. The second device may, for example, communicate using the HyperText Transfer Protocol (HTTP). An SMS gateway is a network gateway that facilitates communication between a device using the Short Message Service (SMS) protocol and another device, such as one using HTTP. A WAP and SMS gateway combines the features of a WAP gateway and an SMS gateway.

In one embodiment, network 105 may include one or more components of an instant messaging service that operates to facilitate communication of instant messaging between client devices 102-104 and SNS 106 or back end server 110.

FIG. 1 shows client devices 102-104 communicating with SNS 106, and SNS 106 communicating with database 108 and back end server 110. Each of these communications may employ a direct connection, one or more networks, or a combination thereof.

A network enabling any one or more of the above communications may employ any form of computer readable media for communicating information from one electronic device to another. Also, the network may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, the network includes any communication method by which information may travel between answer server 112, ads server 114, responder client devices 122-128, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" include a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Though FIG. 1 illustrates an embodiment of a system having each of SNS 106, database 108, and back end server 110 as separate computing devices, the invention is not so limited. Software, hardware, or hardware-software combinations implementing any portion of these components may be combined with any other component on a single computing device, or arranged in a different manner among multiple computing devices. Some portion or all of the functionality of any component may be distributed or duplicated among multiple computing devices.

One embodiment of a network device that may be used to implement any one or more of SNS 106, database 108, or back end server 110 is described in more detail below in conjunction with FIG. 2. Briefly, however, such network devices may include any computing device capable of communicating with other network devices to enable network applications or web sites to process and respond to requests from client devices, such as client devices 102-104. Devices that may operate as these network devices include personal computers desktop computers, multiprocessor systems, microprocessor-based or programmable consumer electronics, network PCs, servers, and the like, or any combination thereof.

SNS 106 or back end server 110 may be configured to receive information associated with a user and to enable the user to manage components of their social network user information, based on the received information. The received information may include, but is not limited to, profile information, category information, an activity, membership information associated with a category, and the like.

SNS 106 or back end server 110 may be configured to facilitate a user of a client device, such as client devices 102-104 to search for or otherwise find information associated with other users, communicate directly or indirectly with other users, or perform other activities with or relating to other users. These actions may include actions such as storing, indexing, or categorizing user information, retrieving information associated with users based on user information, ranking retrieved information, or presenting at least a subset of retrieved information associated with other users. For example, SNS 106 or back end server 110 may facilitate a user submitting one or more keywords, searching information stored in a database of user information, retrieving a set of one or more other users based on the keywords, and sending resulting information to the requesting user. SNS 106 or back end server 110 may further facilitate a communication between a first user and a second user, and may provide some level of privacy protection for one or both communicating users.

SNS 106 may prompt a user at a client device to submit information associated with the user. Such information may include biographical information, information descriptive of user's past, present, or desired activities or interests, information descriptive of the user, and the like. The prompts and the submitted information may be in a variety of formats. This may include multiple choice questions, short answer questions, or prompts for longer, free-text answers. FIG. 4, described below, illustrates an example of an interface prompting a user for information.

Illustrative Network Device Environment

Figure 2:
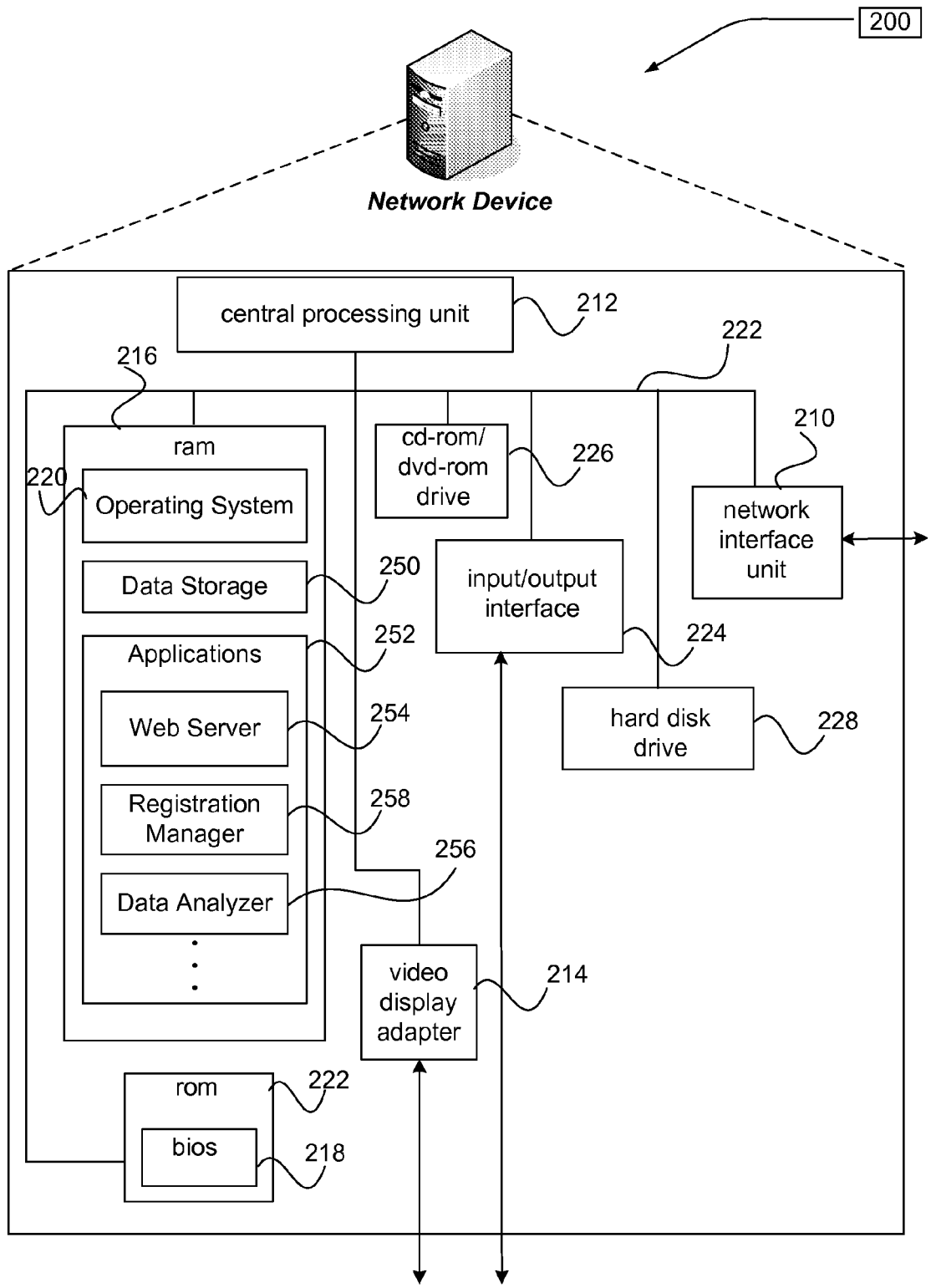
FIG. 2 shows one embodiment of a server device that may be employed in a system implementing the invention.

FIG. 2 shows one embodiment of a server device 200, according to one embodiment of the invention. The embodiment of network device 200 illustrated in FIG. 2 may be used to implement the Social Network Server, the database 108, or the back end server 110 of FIG. 1. Server device 200 may include many more components than those shown. It may also have less than all of those shown. The components shown, however, are sufficient to disclose an illustrative embodiment for practicing the invention. One or more server devices, and the application programs integrated with the devices, may be used to implement the processes of the present invention, as illustrated in FIGS. 4-7 and discussed herein.

Server device 200 includes processing unit 212, video display adapter 214, and a mass memory, all in communication with each other via bus 222. The mass memory generally includes RAM 216, ROM 222, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more data storage components 250 may include program code or data used by the operating system 220 or by applications 252. Data may be stored in ram 216 or other storage devices, such as hard disk drive 228. One or more applications 252 and application components are loaded into mass memory and run on operating system 220. Examples of application programs may include search programs, transcoders, schedulers, calendars, database programs, word processing programs, HTTP programs, customizable user interface programs, IPSec applications, encryption programs, security programs, VPN programs, SMS message servers, IM message servers, email servers, account management and so forth. More detailed discussions of some application programs are included herein.

In one embodiment, applications 252 may include a Web server 254. A Web server may include program logic that performs actions that maintain a Web site or a portion thereof. Such actions may include generating and transmitting Web pages, text, graphic, media, or binary files, prompting a user for information, receiving user information, processing information received from a user, and the like.

In one embodiment, applications 254 may include one or more text analyzers 256. A text analyzer may include program logic that performs actions relating to receiving and analyzing user text information. These actions may include determining whether user text information is valid, within acceptable parameters, a likelihood that the information is responsive to corresponding prompts or questions, and the like. In one embodiment, applications 252 may include a registration manager 258. A registration manager may include program logic that manages a process of registering a user or exchanging information that is part of a user's registration information. These actions may include prompting a user for information, receiving the user information, analyzing the user information, making determinations as to the acceptability of the user information, permissions to complete registration, and the like. In one embodiment, registration manager may employ text analyzer 256 to perform at least some of these or other actions. Actions of the registration manager 258 and text analyzer 256 are discussed in further detail herein. Though FIG. 2 illustrates a Web server, a text analyzer, and a registration manager, the actions and logic of each component may be combined into a single component, divided into multiple components in a different manner, or distributed in a variety of ways across multiple network devices.

Server device 200 may also include an SMTP handler application for transmitting and receiving email. Server device 200 may also include an HTTP handler application for receiving and handling HTTP requests, and an SSL/TLS handler application for handling secure communications.

Generalized Operation

Figure 3:
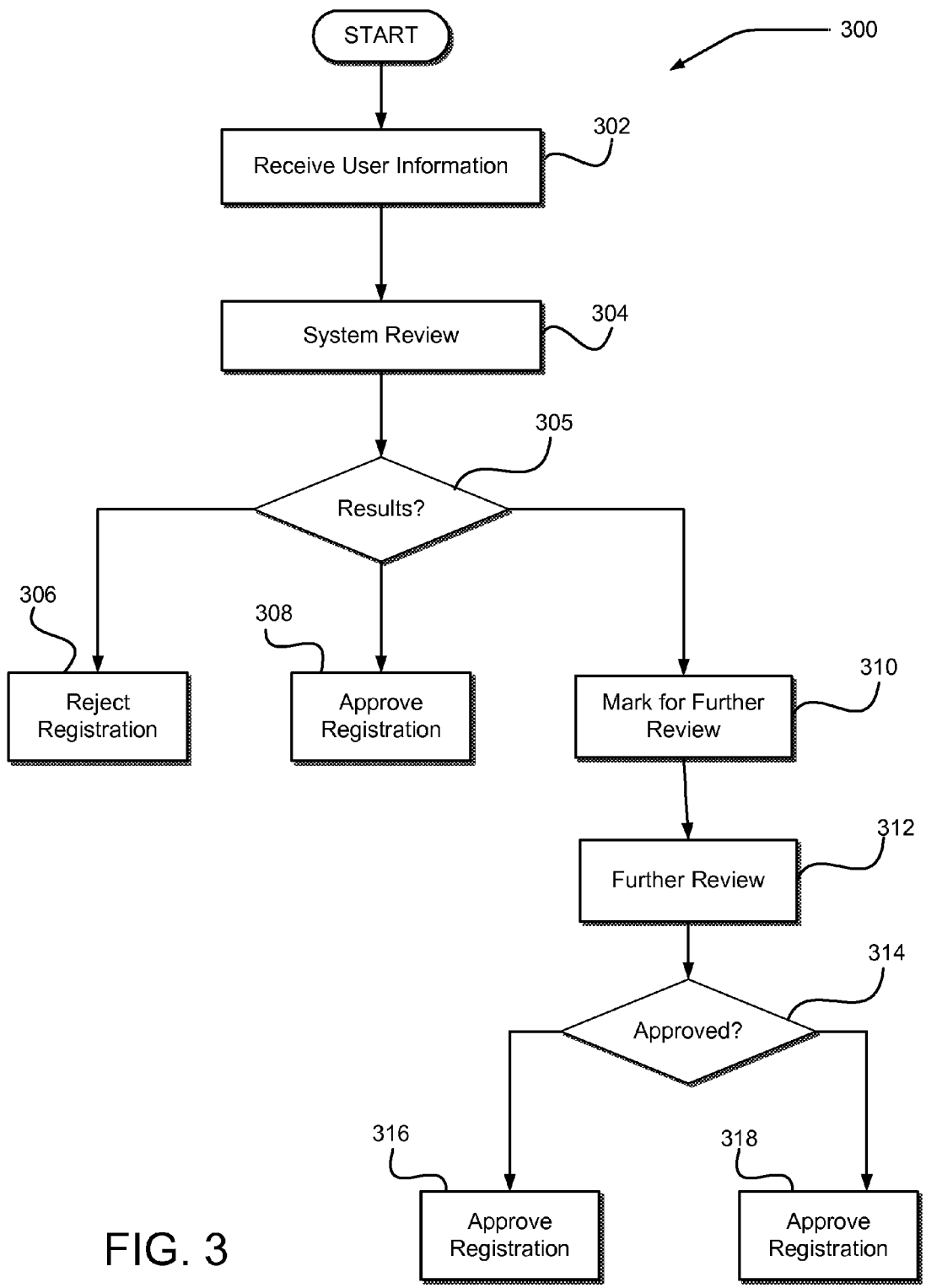
FIG. 3 is a logical flow diagram generally showing one embodiment of a portion of a process for registering for a social network.

FIG. 3 is a high-level flow diagram of a registration process 300 for registering a user in accordance with an embodiment of the invention. Process 300 may employ at least a portion of the system illustrated in FIG. 1. It may employ any of the system variations as discussed herein, or it may be performed with other systems. In one embodiment, process 300 employs server device 200 of FIG. 2. In one embodiment, registration manager 258 performs at least a portion of process 300 and may employ one or more text analyzers 256 to perform portions thereof.

As illustrated in FIG. 3, after a start block, at block 302, registration information may be received. For example, registration information may be sent from one or more of client devices 102-104, and received by SNS 106. Registration information may be in one or more of a number of forms, including text, images, binary information, and the like. In one embodiment, SNS 106 may send one or more web pages to a client device, whereupon a user may enter registration information on the web pages and send the registration back to SNS 106. FIG. 4, discussed below, illustrates an example of such a web page. Registration information may include a plurality of components, where each component represents a response to a prompt or question. For simplicity of illustration, FIG. 3 illustrates a single block 302 representing an action of receiving registration information, however, this action may include an exchange of information that spans a conversation between SNS 106 and a client device. In various embodiments, SNS 106 may receive registration information in an email, a text message, an instant message (IM), a transmitted file, or another type of communication. Registration information may include descriptive information pertaining to the user, such as biographical information, interests, social, political, or other opinions, and the like.

Process 300 may then flow to block 304, where the system reviews the received registration information. This review may include an analysis of the registration information or components thereof. This analysis may include an evaluation of whether the registration information, or a portion thereof, is valid or acceptable, or a determination of a likelihood that the registration information, or a portion thereof, is valid or acceptable. As used herein, the terms "valid" and "validity" refer to one or more of a number of criteria employed by the system to evaluate whether a registration is to be allowed. The actions of block 304, and the included analysis, is illustrated and discussed in further detail in FIGS. 5-8 and accompanying text.

The review of block 304 may result in a determination of a validity of the registration information. Based on this determination, process flow may flow to one of two or more process flows. The three process flows illustrated in FIG. 3 are represented by three action blocks: block 306, block 308, and block 310, each of which is now discussed.

Block 306 represents an action in response to a determination that registration information is not valid. At block 306, the system rejects the registration information. In one embodiment, a rejection of the registration information may include marking the information, or a particular component, as invalid. It may further include sending a rejection notification to the user at one of the client devices 102-104. In one embodiment, the notification of the user may be delayed until a later time, such as when a status inquiry, an attempt to log on, an attempt to use a service, or other action is initiated by the user.

If, at block 304, it is determined that the registration information is valid, process may flow to block 308, where the system approves the registration information. This may include marking the information, or a particular component, as valid. It may further include sending an approval notice to the user at one of the client devices. In one embodiment, approval may be inferred by a lack of a rejection notice.

If, at block 304, it is determined that additional review is desired, process may flow to block 310, where the registration information is marked for additional review. This action may include sending the registration request to another server, adding the registration request to a queue or a set of requests, or any of a number of ways of indicating the status of additional review required. In one embodiment, analysis information, such as one or more scores, indications of specific portions of the registration information that need review, or other such information resulting from analysis, may be associated with the registration information. In one embodiment, a score represents a likelihood that the registration information is valid. In one embodiment, a limited approval may be granted pending a further review. In one embodiment, neither a rejection nor approval is performed prior to further review.

Process may then flow to block 312, where further review is performed. In one embodiment, further review includes a person performing a review based on the registration information. In one embodiment, the actions of blocks 310 or 312 may include receiving additional registration information. For example, the system may send a query to the user at a client device to request additional information or a revision of the received information. The query may be performed automatically, by a person, or a combination thereof.

Process may then flow to decision block 314, where a determination is made of whether the registration information is approved. If it is approved, process flows to block 316, where the registration is approved. This action may be similar to that described above with respect to block 308. If the registration information is not approved, process flows to block 318, where the registration is rejected. This action may be similar to that described above with respect to block 306. Though not illustrated, in one embodiment, a determination may be made that yet additional review is desired, whereupon process may flow back to block 310, or in another manner to perform additional reviews.

FIG. 3 illustrates three possible process flows based on the system review of block 312, though in various embodiments, more or less may be possible. In one embodiment, the actions represented by blocks 310-318 are not in the process, and the action of block 304 results in either a rejection or an approval. In one embodiment, a conditional approval may be employed. A conditional review may be implemented as one or more types of restrictions to a registration. A restriction may be based on an amount of time for which a registration is valid, an amount of usage allowed, types of services or access allowed, another type of restriction, or combinations thereof.

FIG. 4 is a pictorial representation of portions of a web page 400 or a set of web pages that may be employed to retrieve registration information. Web page 400 includes numerous prompts and input fields to facilitate a user entering and submitting registration information. For simplicity, only a portion of the components of such a web page are illustrated. A illustrated, web page 400 includes a short answer box 402 for entering a user name, list box 404 for selecting a gender from two provided choices, list box 406 for selecting a gender of interest in a social partner, and a short answer box 408 for entering a zip code. As illustrated, an asterisk ("*") next to fields 402, 404, 406, and 408 indicates that a user is required to enter information in each of these fields in order for the page to be accepted. In one implementation, a minimum number of characters may be required in one or more of the short answer boxes 402 or 408.

Web page 400 also illustrates a list box 410 for selecting from a list of ethnic groups and a list box 412 for selecting from a list of heights. Web page 400 also illustrates a set of checkboxes 414 for selecting zero or more personal interests.

Web page 400 also includes a text box 420 for entering an introduction line, and a multi-line free text box 422 for entering user information. In particular, prompt 424 directs the user to enter information that is self-descriptive and also descriptive of an ideal match that the user seeks. Prompt 424 further directs that a minimum of 120 characters be entered in free text box 422. A user may freely enter text in free text box 422, including alphanumeric characters, punctuation, white space, and the like. In one embodiment, the user is provided with the ability to paste text that has previously been copied into multi-line text box 422. As indicated by the asterisks, in one embodiment, a user is required to enter information in text boxes 420 and 422.

In accordance with the invention, a wide variety of web pages, combinations of web pages, or other mechanisms for the submission of registration information may be employed. For illustrative purposes, and for brevity, only a sampling of an exemplary web page is provided herein.

Web page 400 includes short answer input fields 402-406 for entering biographical information such as name, geographical location (e.g. zip code), and the like. Input fields, such as input fields 408-410, for selecting one or more answers from a set of answers may also be provided. Virtually any type of prompt or input mechanism may be employed for submitting registration information.

Free text field 422 is provided for facilitating a user entering textual registration information. In one embodiment, a minimum amount of text is suggested or required. For example, a minimum of 120 characters of text, 120 words of text, or another such measurement may be required. In accordance with aspects of the invention described herein, a system analyzes the content of text entered into a free text field, such as free text field 422, to determine a likelihood that the entered text is responsive to the prompt or question. For example, text that results from a user copying and repeatedly pasting a short amount of text until the minimum field length is reached would be considered to not be authentic. In another example, randomly or partially randomly entering text, or merely pressing keys on a keyboard without attempting to form or appear to form words or phrases would be considered to not be authentic.

Figure 5:
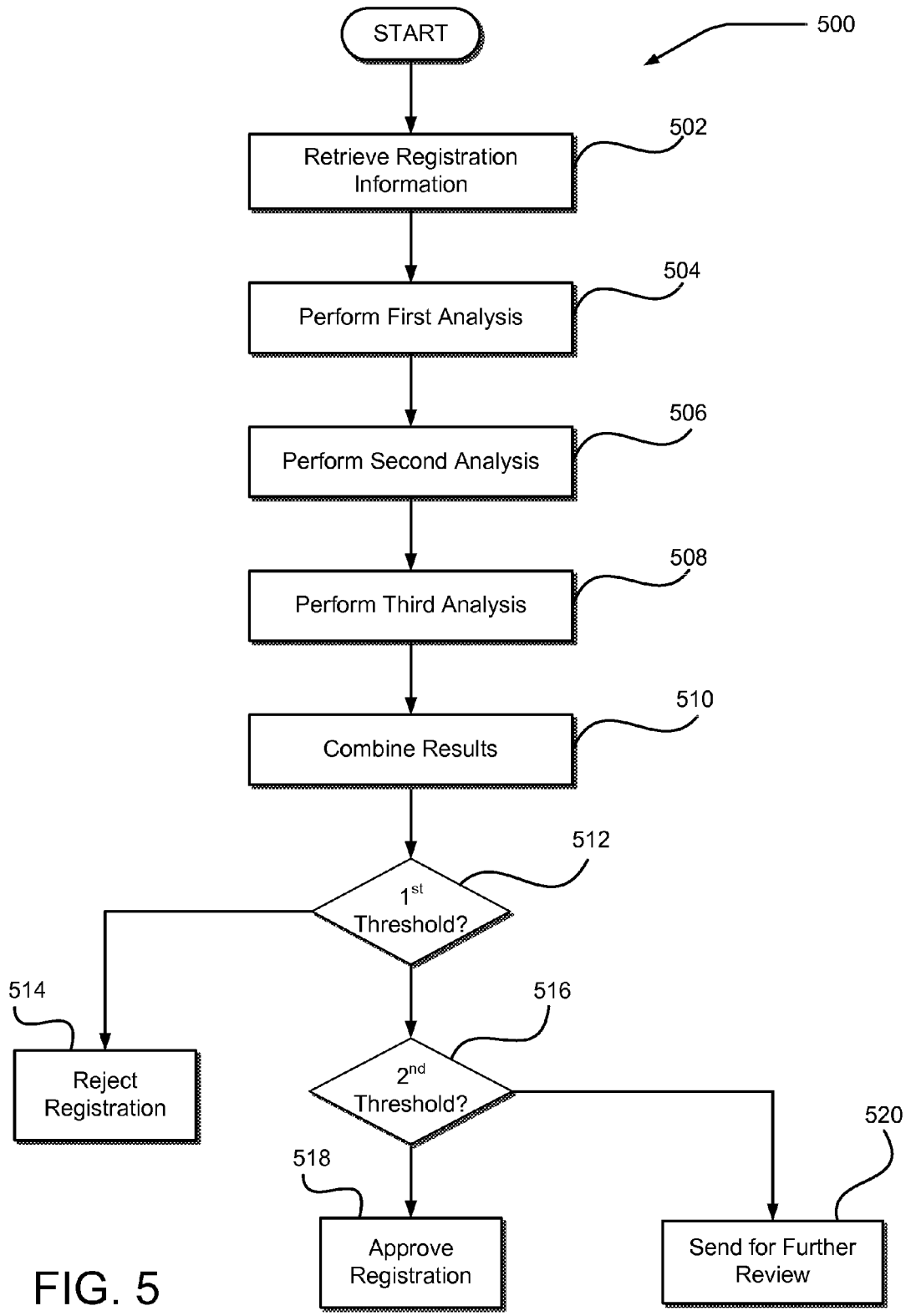
FIG. 5 is a logical flow diagram generally showing one embodiment of a process for reviewing a registration application.

FIG. 5 is a logical flow diagram generally showing one embodiment of a process 500 for reviewing registration information. At least a portion of process 500 may be included in the actions of block 304 of FIG. 3. In one embodiment, registration manager 258, of FIG. 2, performs all, or at least a portion of process 500 and may employ one or more text analyzers 256 to perform portions thereof.

Process 500 begins, after a start block, at block 502, where one or more components of the registration information is retrieved. In one embodiment, the component of registration information includes a block of text entered and sent by a user at a client device. In one embodiment, the block of text includes one or more of biographical information, information descriptive of the user's past, present, or desired activities or interests, information descriptive of the user, the user's views, politics, philosophies, and the like. In one embodiment, the textual information may be useful for allowing other users to decide whether to associate with the user. The action of retrieving registration information may include combining, dividing, or otherwise manipulating the information into a form for further processing. The information may be stored in one or more locations.

Process 500 may then flow to block 504, where a first analysis of the registration information is performed. In accordance with the present invention, the first analysis may be performed in a variety of ways. Details of this action in accordance with various embodiments of the invention are described in further detail in FIGS. 6-8 and associated text below. In one embodiment, the first analysis generates one or more values that represent a score indicative of a likelihood that the registration information is valid information.

Process 500 may then flow to block 506 and block 508, where a second and a third analysis of the registration information is performed. As described for the analysis of block 504, the actions of blocks 506 and 508 may be performed in a variety of ways, and FIGS. 6-8 and associated text describe various embodiments of these actions. In one embodiment, each of the actions of blocks 506 and 508 generate one or more values that represent scores indicative of a likelihood that the registration information is valid information.

In one embodiment, each of the actions of blocks 504, 506, and 508 are independent of each other, and may be performed in any order or concurrently. In one embodiment, one or more of the actions are selectively performed based on the results of one or more of the other analyses. For example, an analysis may be performed if the results of a previous analysis or a combination of analyses are above a predetermined threshold or below a predetermined threshold. In one embodiment, results from a previous analysis serve as input to a subsequent analysis and are used in determining subsequent results.

Each of the actions of blocks 504, 506, or 508 may be performed on a single text block or a combination of text blocks. They may be performed on the same block or blocks of text, or on different blocks of text. In one embodiment, each of the actions of blocks 504, 506, or 508 are performed without incorporating the use of information associated with the user that may be known from previous communications or from information derived from fields other than the target text block.

Though FIG. 5 illustrates three blocks representing analysis operations, more or less numbers of analysis may be used in accordance with the invention. In one embodiment, one of the analyses is used.

Process 500 may then flow to block 510, where the results of each prior analysis are combined to obtain a combined result. In one embodiment, the combination of results occurs at each block of analysis, and the action of block 510 comprises receiving the results produced by one of the blocks of analysis. In one embodiment, the actions of block 510 result in a value representing a score indicative of a likelihood that the received registration information is valid.

In one embodiment, each of the analysis operations performs analysis based on the content of the information. This may include, for example, data as to whether the content includes punctuation, white space, or alphanumeric characters, and the like, or a count as to the number of each type of these classifications, and the like, however, the analysis may refer to other characteristics of the content. Content of the information is distinguishable from characteristics such as the length of the text block in bytes or characters, though such information may be used in analysis in accordance with the invention.

In one embodiment, process 500 includes a mechanism that employs merits and demerits to indicate or determine a likelihood that the registration information is valid. Merits are units such that each merit represents a positive unit of likelihood of authentic information. A higher count of merits indicates a higher likelihood of authenticity. Demerits are negative merits. That is, a higher count of demerits indicates a lower likelihood of authenticity. Merits and demerits may be combined, for example, by considering demerits to be negative merits, to obtain a single value representing a likelihood of authenticity. In one embodiment, a single merit corresponds to approximately a one percent likelihood of authenticity. For example, a value of 50 demerits combined with a value of 10 merits may result in a "score" of negative 40, which may represent a 40% likelihood that the registration information is not authentic, or conversely, a 60% likelihood that the information is authentic.

Process 500 may then flow to one or more decision blocks that evaluate actions to perform based on the results of block 510. These decisions may employ one or more thresholds dividing the results into two or more categories, each category having an associated set of results. FIG. 5 illustrates two decision blocks associated with two thresholds and three sets of actions, though more or less may be employed. As illustrated, decision block 512 determines whether the results are above a first threshold used to filter out candidates for rejection. If, at decision block 512, it is determined that the registration request does not pass the first threshold, process flow proceeds to block 514, where the registration is rejected, such as discussed in block 306 of FIG. 3. For example, in one embodiment, the first threshold may be negative 60, and a result of less than negative 60 may be rejected.

If, at decision block 512, it is determined that the registration request passes the first threshold, process 500 may flow to decision block 516, where a determination may be made of whether the results pass a second threshold, used to filter out candidates for approval. If, at decision block 516, it is determined that the registration request passes the second threshold, process flow proceeds to block 518, where the registration is approved, such as discussed in block 308 of FIG. 3. For example, in one embodiment, the second threshold may be negative 20, and a result of greater than negative 20 may be approved.

If, at decision block 516, it is determined that the registration request does not pass the first threshold, process 500 may flow to block 520, where the registration is sent for additional review, such as described in blocks 310-318 of FIG. 3. For example, in one embodiment, a result between negative 60 and negative 20 may be sent for additional review.

In one embodiment, the actions associated with additional review are not employed. For example, a decision may be made, based on the results of block 510, to either reject or approve the registration application. In one embodiment, one or more additional categories may be employed, such as conditional approval. Conditional approval may be used in addition to, or instead of, approval. A category of conditional approval may result in the registration application being temporarily approved and also put on a queue to receive a human review. This would allow a user to access the service at least temporarily, until the further review is performed. Thus, various combinations of categories of results may be employed, some of which include additional review. As discussed above, additional review may include employing a person to perform at least some of the additional review. In one embodiment, a category of conditional approval is used in addition to another category requiring further review. A queue of applications that have been given conditional approval may be given a higher priority than a queue of applications not approved, in order to avoid problems resulting from incorrect approvals.

Though not illustrated in FIG. 5, in one embodiment, a server, such as SNS 106, back end server 110, or another server, may periodically, or in the background, review user information that has been approved and for which the user has access to the service. This server may access database 108 to obtain user information. This background review may use the results of the initial review as illustrated in FIG. 5 and discussed herein, or it may perform at least a portion of the analyses represented by blocks 504, 506, and 508. The background review may use these or other analyses to prioritize candidates for a further review, such as a human-based review. The background review may also consider information entered subsequent to a registration, or behaviors of users, when performing reviews or prioritizing review candidates.

As used herein, the term "lexicon" of a text block refers to the set of unique words in the text block including sets of unique words that result from relatively minor exclusions of words. In one embodiment, the words of the lexicon comprise text with white space removed. A minor exclusion may include, for example, excluding words below a minimum word size. Another example of a minor exclusion may be excluding numbers, punctuation, and the like. In some embodiments, words may be considered to not be unique if they are merely a different form of another word, such as a plural form or a form having a common suffix. In one embodiment, case of letters is ignored when determining the uniqueness of a word. In one embodiment, the length of the lexicon is measured in units of characters, and the length of the text block is measured in units of characters. In one embodiment, the length of the lexicon is measured in words, and the length of the text block is measured in words.

Figure 6A:
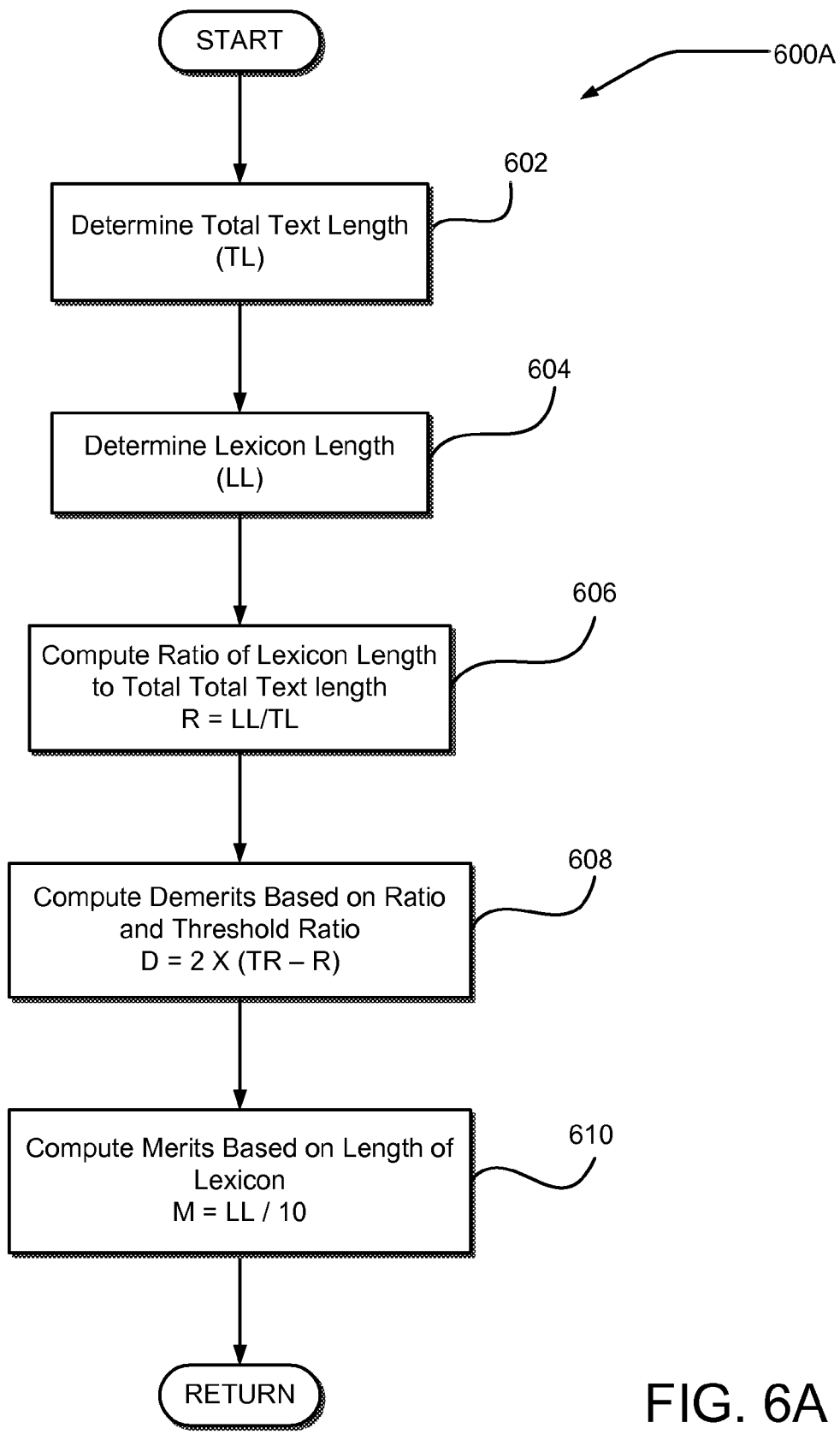
FIGS. 6A-B are logical flow diagrams generally showing embodiments of a process for analyzing registration information.

FIG. 6A is a flow diagram illustrating a process 600A for analyzing registration information in accordance with one embodiment of the invention. In one embodiment, registration text analyzer 256, of FIG. 2, performs at least a portion of process 600A. Process 600A may be performed as at least part of the actions of block 504 of FIG. 5. One or more text blocks that are received as part of the registration information received at block 502 may be the subject of the actions of process 600A. Process 600A begins, after a start block, at block 602, where the total text length (TL) of the text block is determined. The total text length may be measured in characters of text, characters with white space or selected punctuation removed, or another measurement of the length of the text block.

At block 604, the lexicon length (LL) of the text block is determined. At block 606, a ratio of the lexicon length to the total text length may be computed. For example, in a text block of length 200, with a lexicon length of 150, the ratio R may be determined to be 150/200, or 0.75.

Process 606A may then flow to block 608, where a number of demerits may be determined based on the ratio R and a threshold ratio. The threshold ratio is a ratio of lexicon length to total text length that has been determined based on a normal distribution of ratios in authentic text blocks of a similar nature, received from previous registration information from prior users. For example, a threshold ratio may be a value approximately equal to, slightly below, or a standard deviation below, a median ratio. Thus, the invention recognizes that a ratio significantly below a median or mean ratio represents an increased likelihood that the text block is not authentic. Lower ratios may result in an increased number of demerits. In one embodiment, a threshold ratio of 0.60 is employed, though higher or lower threshold ratios may be used. The determination of demerits at block 608 may include multiplication by a factor to normalize the resultant demerits. In one embodiment, a ratio less than the threshold ratio is multiplied by two, and a ratio greater or equal to the threshold ratio is considered to be zero. Thus, for every one percent less than the threshold ratio, two demerits are produced. Different factor values may be used in accordance with the invention. In one embodiment, the formula D=2×(TR−R) may be used to determine demerits, where TR represents a threshold ratio and R represents the ratio of lexicon length to total text length.

Process 600A may then flow to block 608, where a number of merits are determined, based on a lexicon length. In one embodiment, the formula M=LL/10 may be used to determine merits, resulting in one merit for every 10 units of lexicon length. Thus, a number of merits at block 608 may be proportional to the lexicon length of the text block. Different factor values may be used in accordance with the invention. Process 600A may then return to a calling program.

Figure 6B:
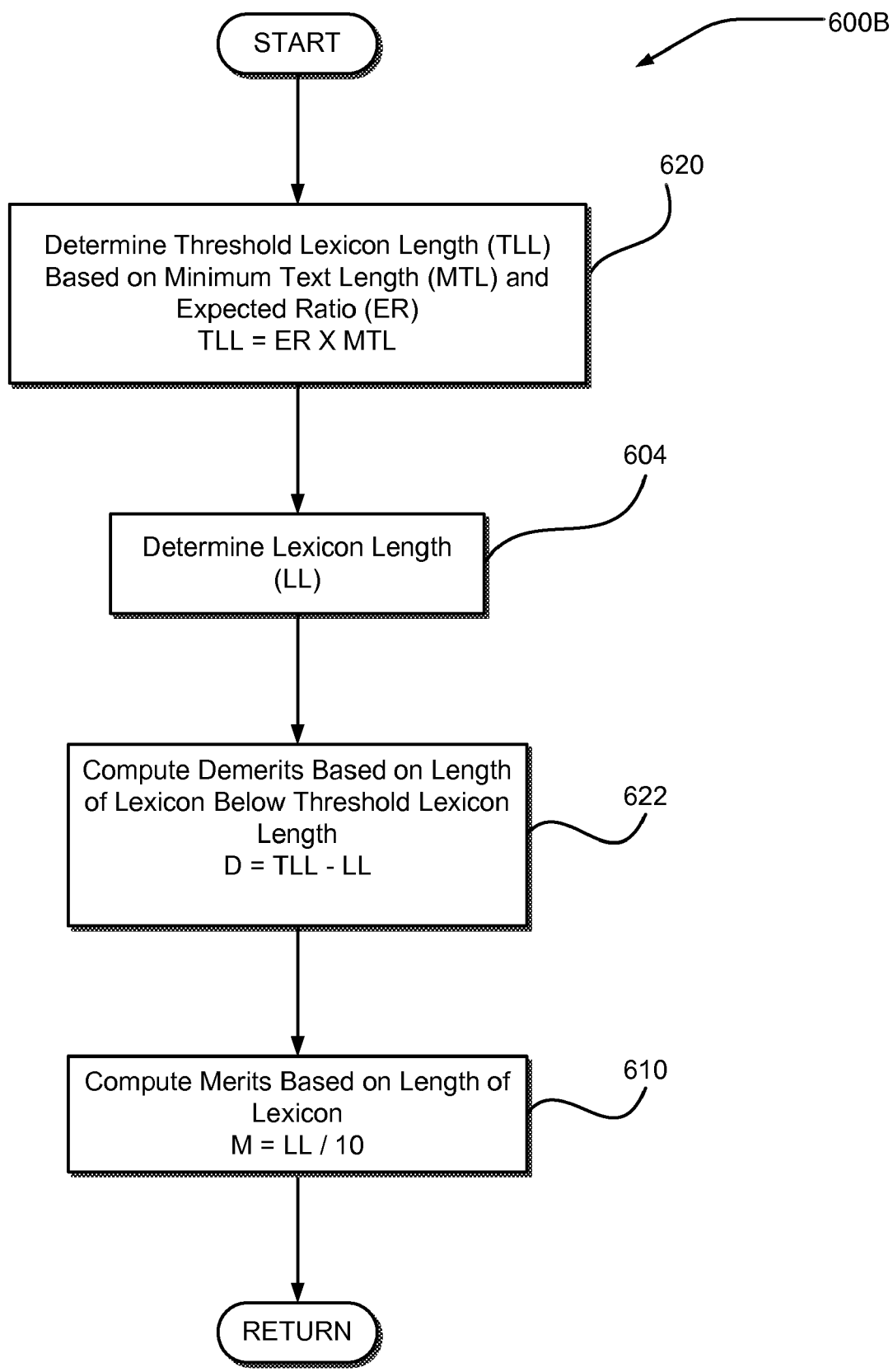

FIG. 6B is a flow diagram illustrating a variation of the process 600B for analyzing registration information, in accordance with one embodiment of the invention. All, or a portion of the description of FIG. 6A may be applicable to the process 600B, and like numbered blocks may be considered equivalent to blocks described above. Hence, only blocks 620 and 622 of process 600B are now described.

At block 620, a threshold lexicon length (TLL) is determined. The TLL may be based on a minimum text length (MTL) that is allowed or expected. The TLL is similar to the threshold ratio employed in process 600A, but it is a threshold in units of length, rather than a ratio. In one embodiment, a TLL may be determined by multiplying a threshold ratio by a minimum text length that is allowed or expected. For example, if a threshold ratio is 0.60, and a minimum text length of 200 characters is expected, a TLL may be 0.60×200, or 120. A TLL may be predetermined, determined dynamically after receiving registration information, or determined at another time.

At block 622, a number of demerits may be determined based on a difference between the TLL and the LL, such that the number of demerits increases as the value of LL falls below the value of the TLL. Similar to the description of block 608, the invention recognizes that a LL significantly below a threshold lexicon length represents an increased likelihood that the text block is not authentic. Lower values of the LL may result in an increased number of demerits. Though not illustrated in block 622, the determination of demerits at block 622 may include multiplication by a factor to normalize the resultant demerits. In one embodiment, a LL equal to or greater than the TLL is considered to be zero in the determination of demerits.

As described for process 600A, process 600B may flow to block 608 and then return to a calling program.

Figure 7:
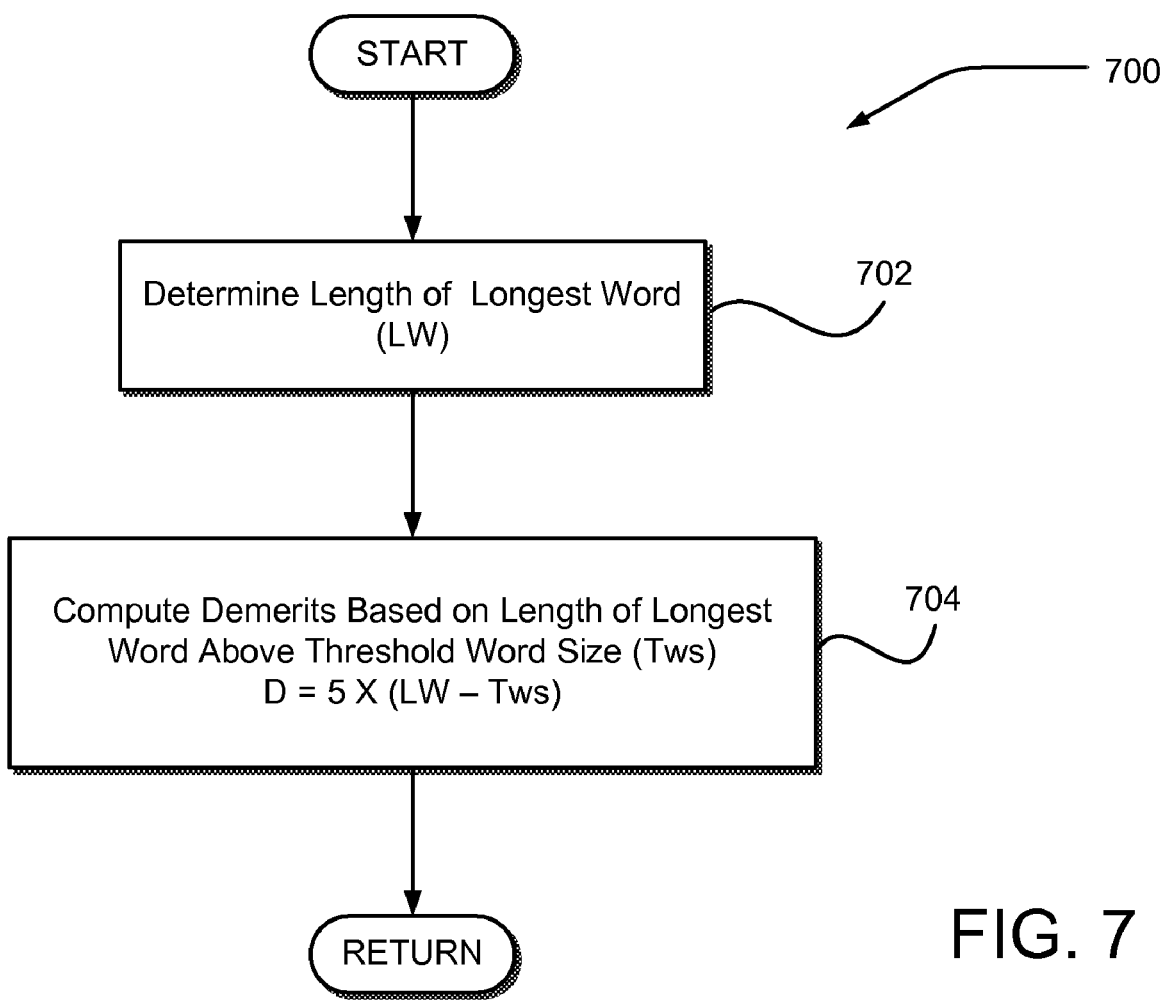
FIG. 7 is a logical flow diagram generally showing one embodiment of a process for analyzing registration information.

FIG. 7 is a flow diagram illustrating a process 700 for analyzing registration information in accordance with one embodiment of the invention. In one embodiment, registration text analyzer 256, of FIG. 2, performs at least a portion of process 700. Process 700 begins, after a start block, at block 702, where the longest word of the text block is determined. A "word" may be recognized as a string of text delimited by white space or one of a set of word delimiters. White space refers to characters or markings that generally appear as spaces or line endings when viewed as text. White space may include characters such as a space, a non-breaking space, a tab, a line break, a section break, a page break, or a carriage return, though in some embodiments, not all of these characters or markings are used. Word delimiters used in recognizing a word may include a period, comma, question mark, exclamation mark, left or right parenthesis, hyphen, and the like, though in some embodiments not all of these characters or markings are used, or additional word delimiters may be used. The number of characters in the longest word may be considered to be the longest word length.

Process 700 may then flow to block 704, where a predetermined threshold word size may be subtracted from the longest word length. A number of demerits may be computed based on, and proportional to, the result of the subtraction. The predetermined threshold word size may be based on normal values for the longest word length in authentic text blocks of a similar nature received from previous registration information from prior users. For example, a threshold word size may be a value approximately equal to, slightly above, or a standard deviation above a median or mean word size. Thus, the invention recognizes that a longest word size significantly above a median or mean word size represents an increased likelihood that the text block is not authentic. In one embodiment, a threshold word size of 20 is employed, though higher or lower threshold word sizes may be used.

In one embodiment, the difference between the longest word size and the threshold word size, if positive, may be multiplied by a factor to normalize the resultant demerits. In one embodiment, a positive difference is multiplied by five, and a negative difference is considered to be zero. Thus, for every character above the threshold word size, five demerits are produced. Different factor values may be used in accordance with the invention. Process 700 may then return to a calling program.

Figure 8:
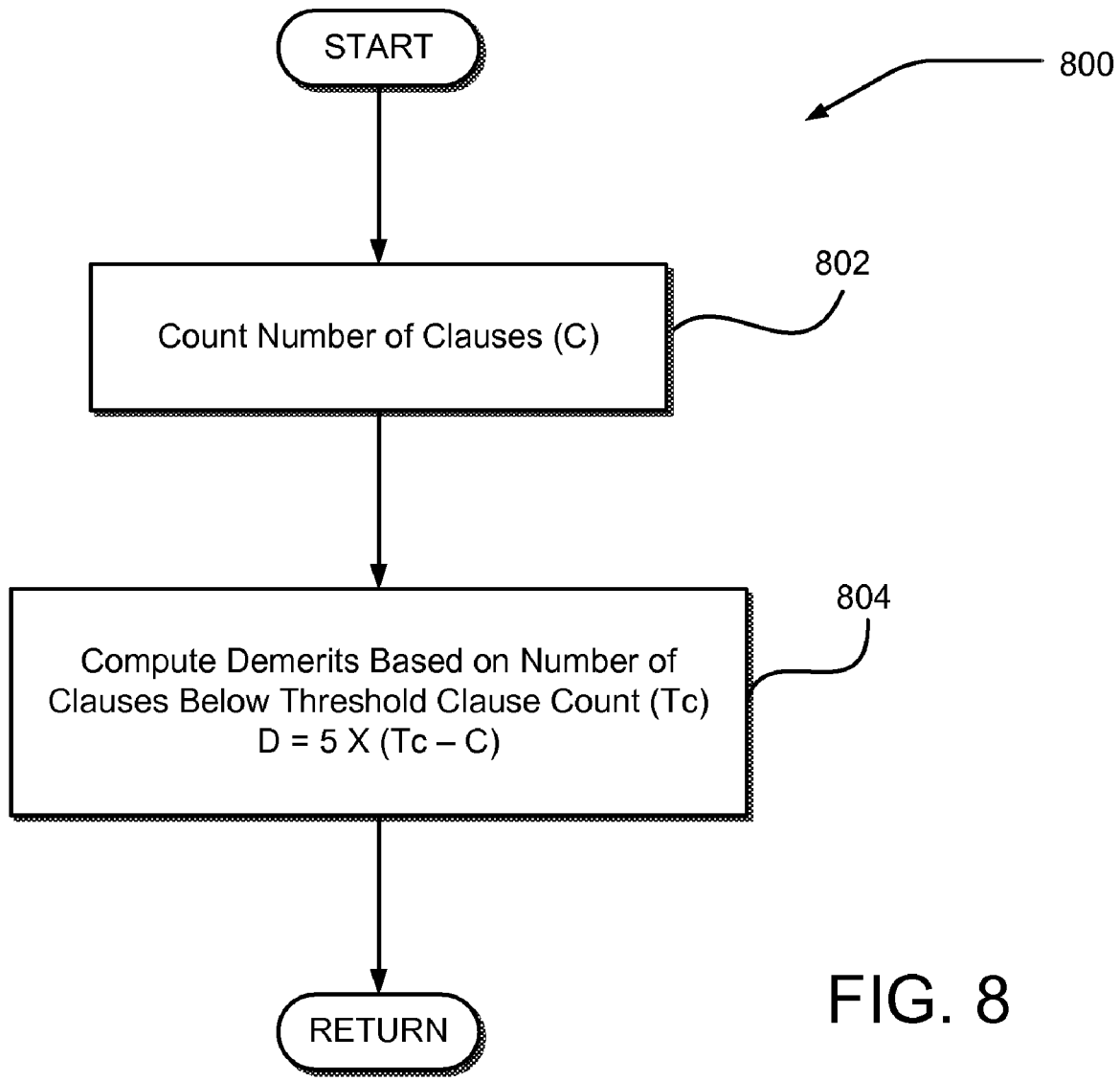
FIG. 8 is a logical flow diagram generally showing one embodiment of a process for analyzing registration information.

FIG. 8 is a flow diagram illustrating a process 800 for analyzing registration information in accordance with one embodiment of the invention. In one embodiment, registration text analyzer 256, of FIG. 2, performs at least a portion of process 800. Process 800 begins, after a start block, at block 802, where the number of clauses in the text block is determined. A "clause" may be recognized as a string of text delimited by a predefined set of clause delimiters. Clause delimiters used in recognizing a clause may include a period, comma, question mark, exclamation mark, and the like. In one embodiment, semicolons are excluded from the set of clause delimiters.

Process 800 may then flow to block 804, where the number of clauses determined at block 802 is subtracted from a predetermined threshold clause count. A number of demerits may be determined based on, and proportional to, the results of this subtraction. The threshold clause count may be a value based on a median or mean number of clauses in authentic text blocks of a similar nature received from previous registration information from prior users. Thus, the invention recognizes that a number of clauses below this threshold clause count represents an increased likelihood that the text block is not authentic. In one embodiment, a threshold clause count of 5 is employed, though higher or lower threshold clause counts may be used.

In one embodiment, the difference between the threshold clause count and the determined number of clauses, if positive, may be multiplied by a factor to normalize the resultant demerits. In one embodiment, a positive difference is multiplied by five, and a negative difference is considered to be zero. Thus, five demerits are produced for each value by which the number of clauses is less than the threshold clause count. Different factor values may be used in accordance with the invention. Process 800 may then return to a calling program.

It will be understood that each block of the flowchart illustrations of FIGS. 3 and 5-8, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustrations may also be performed concurrently with other blocks or combinations of blocks, or even in a different sequence than illustrated without departing from the scope or spirit of the invention.

Accordingly, blocks of the flowchart illustrations support combinations of means for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for employing at least one network device to provide access to a network service for a user, wherein the network device performs actions, comprising:
    receiving, from a user at a client device, user information comprising at least one text block that includes registration information that further includes at least one of biographical information, interests information, social information, political information, or opinion information;
    determining a lexicon from the at least one text block, wherein the lexicon includes a set of at least one unique word that is a result of an exclusion in the at least one text block of at least one of an alphanumeric character, another word and punctuation;
    determining an authenticity value based on combining units of merits and demerits, wherein the authenticity value is further based on at least one of a length of the lexicon derived from the at least one text block, a length of at least one word in the at least one text block, or a number of clauses in the at least one text block;
    selectively designating the user information as authentic based on a relationship between the authenticity value and a threshold value; and
    if the user information is designated as authentic, allowing the user to access the network service.

2. The method of claim 1, further comprising:
    designating the user information as inauthentic based on the authenticity value; and
    if the user information is designated as inauthentic, preventing the user from accessing the network service.

3. The method of claim 1, further comprising, based on the authenticity value, selectively performing a human-based filtering.

4. The method of claim 1, wherein the authenticity value is based on at least two of a length of a lexicon derived from the at least one text block, a length of at least one word in the at least one text block, or a number of clauses in the at least one text block.

5. The method of claim 1, wherein the authenticity value is based on a relationship between a length of a lexicon derived from the at least one text block and a length of the at least one text block.

6. The method of claim 5, wherein the length of the lexicon is based on a number of characters in the lexicon and the length of the at least one text block is based on a number of characters in the at least one text block.

7. The method of claim 1, wherein the authenticity value is based on a difference between the longest word derived from the at least one text block and a threshold longest word size.

8. The method of claim 1, further comprising selectively associating the user with another user based on the at least one text block.

9. The method of claim 1, further comprising:
    prior to allowing the user to access the network service, determining a second authenticity value corresponding to the user; and
    selectively preventing the user from accessing the network service, based on the second authenticity value.

10. The method of claim 1, wherein the network device includes a storage device containing program logic to perform the method of claim 1.

11. A server device for providing access to a network service by a computing device, comprising:
    a transceiver device for sending and receiving information including a text block to the computing device, wherein the text block includes registration information that further includes at least one of biographical information, interests information, social information, political information, or opinion information; and
    a processor device that executes a registration manager application to enable actions, including:
        determining a lexicon from the text block, wherein the lexicon includes a set of at least one unique word that is a result of an exclusion in the text block of at least one of an alphanumeric character, another word and punctuation;
        determining a likelihood of authenticity of the text block based on combining units of merits and demerits, wherein the likelihood of authenticity is further based on at least one of a length of the lexicon derived from the text block, a length of at least one word from the text block, or a number of clauses in the text block; and
        selectively allowing access to the network service based on the likelihood of authenticity.

12. The system of claim 11, wherein determining the likelihood of authenticity is based on the length of the lexicon derived from the text block and at least one of the length of at least one word from the text block or the number of clauses in the text block.

13. The system of claim 11, wherein the actions further comprise selectively, based on the likelihood of authenticity, performing a human-based determination of authenticity.

14. A system for providing access by a user to a network service, comprising:
    a network device that is operative to perform actions, including:

determining a lexicon from at least one text block, wherein the lexicon includes a set of at least one unique word that is a result of an exclusion in the at least one text block of at least one of an alphanumeric character, another word and punctuation, wherein the text block includes registration information that further includes at least one of biographical information, interests information, social information, political information, or opinion information;

determining a likelihood of authenticity for the user based on combining units of merits and demerits, wherein the likelihood of authenticity is further based on content of the at least one text block;

conditionally allowing access to the network service by the user, based on the determined likelihood of authenticity; and associating the user corresponding to the at least one text block with other users, based on the content of the at least one text block.

15. The system of claim 14, wherein determining the likelihood of authenticity includes determining a first value based on a first characteristic of the content of the text block, and a second value based on a second characteristic of the content of the text block, and combines the first value and second value.

16. The system of claim 14, wherein determining the likelihood of authenticity further includes determining-the likelihood of authenticity based on a length of the lexicon of the text.

17. The system of claim 14, wherein determining the likelihood of authenticity is based on a length of at least one word in the text block.

18. The system of claim 14, wherein determining, the likelihood of authenticity employs at least one metric derived from authentic text blocks received from prior users.

* * * * *